Patented Mar. 7, 1950

2,499,756

UNITED STATES PATENT OFFICE 2,499,756

MIXTURE OF POLYETHYLENE WITH HYDROCARBON OBTAINED BY HYDROGENATION OF CARBON MONOXIDE

Ralph Albert Jacobson, Landenberg, Pa., assignor to E. I. du Pont de Nemours & Company, Wilmington, Del., a corporation of Delaware No Drawing. Application September 6, 1945, Serial No. 614,814

2 Claims. (Cl. 260—33.6)

This invention relates to polymeric materials and more particularly to ethylene polymer compositions.

Ethylene polymers of the kind described in United States Patents 2,153,553 and 2,168,465, and particularly the unmodified polyethylene have several properties which make this type of hydrocarbon polymer outstanding for many commercial applications. Films of these polyethylenes of 1 mil in thickness however, are quite limp as compared to films of polystyrene and cellulosic films, e. g., cellophane, and consequently are not satisfactorily handled in current type wrapping film machines. The permeability of these ethylene polymer films to the passage of water vapor is also higher than is desirable.

This invention has as an object a new and useful composition of matter comprising ethylene polymer. A further object is an improved type of ethylene polymer film which is highly impermeable to the passage of water vapor and which possesses to a high degree the properties most desired in unsupported wrapping films and in protective and insulating coatings. A further object is a method for improving the stiffness and moistureproofness of ethylene polymer films.

The above objects are accomplished by means of a blend of paraffin hydrocarbon melting above 120° C. and particularly described below, with an orientable ethylene polymer of the kind described in U. S. Patents 2,153,553 and 2,188,465.

The paraffin hydrocarbons used in the practice of this invention, which can be obtained by catalytic hydrogenation of carbon monoxide, have a bending modulus greater than $0.070 \times 10^6$ pounds per square inch and a moisture permeability value less than 20 IPV units per mil film thickness. The IPV or initial permeability value is defined as the grams of water passing through 100 square meters in one hour at a vapor pressure difference of 53 millimeters of mercury at a temperature of 39.5° C. ±0.5° C. The present blands of paraffin hydrocarbons with the high molecular weight orientable ethylene polymers are at least twice as stiff and at least twice as moistureproof, at a given film thickness, as is the high molecular weight orientable ethylene polymer alone at the same film thickness.

Paraffin hydrocarbons of the kind mentioned above may be obtained by hydrogenating carbon monoxide under elevated temperatures (125° to 250° C.) and pressures in excess of 100 atms. over hydrogenation catalysts such as cobalt and ruthenium. They are compatible in all proportions with tough, orientable polyethylenes. The preparation of these paraffin hydrocarbons is more specifically described in Brennstoff Chem. 19, 226–30 (1938).

The following example is further illustrative of the practice of this invention, unless otherwise stated, the parts are by weight.

*Example*

The following compositions were prepared by blending on a smooth mill at 140° C. a tough, orientable high molecular weight ethylene polymer and a solid paraffin hydrocarbon obtained by the hydrogenation of carbon monoxide. These two hydrocarbon polymers possessed the following properties.

| | Density (g./cc.) | Melting Point, °C. | Bending Modulus×10⁻⁶, lb./sq. in. | Moisture Permeability (IPV/mil) |
|---|---|---|---|---|
| Polyethylene | 0.911 | 107 | 0.014 | 77–81 |
| Paraffin hydrocarbon | 0.963 | 126 | 0.104 | 0–4 |

The improved properties obtained on blending these two materials are shown in the following table:

| Blend | Composition | Tensile Strength at Break (lb./sq. in.) | Bending Modulus×10⁻⁶ (lb./sq. in.) | Clark Stiffness (3 mil film) | Moisture Permeability (IPV/mil) |
|---|---|---|---|---|---|
| A | 100% ethylene polymer | 2,040 | .014 | 1.75 | 77.3 |
| B | 80% ethylene polymer, 20% paraffin hydrocarbon | 1,600 | .031 | 4.57 | 33.6 |
| C | 70% ethylene polymer, 30% paraffin hydrocarbon | 2,065 | .040 | 5.31 | 15.9 |
| D | 60% ethylene polymer, 40% paraffin hydrocarbon | 2,200 | .050 | 8.04 | 9.4 |
| E | 100% paraffin hydrocarbon | Brittle | ¹ ca. 104 | Brittle | ¹ ca 0 |

¹ Data extrapolated from blend data.

As can be seen from the above table, the addition of 40% of a solid paraffin hydrocarbon to 60% polyethylene increases the moistureproofness more than nine hundred per cent. On a purely additive basis, assuming that the solid paraffin hydrocarbon has a moistureproofness of zero, the initial permeability value of the ethylene polymer would have been reduced to $^{60}/_{100} \times 77.3$ or 46.4. The fact that the initial permeability value is 9.4 demonstrates that the paraffin hydrocarbon has enhanced the moistureproofness of the ethylene polymer. Furthermore, blend C is more than three times as stiff as the ethylene polymer used to prepare the blend. Since the ethylene polymer film at 1 mil thickness has an initial water-vapor permeability value of about 77 IPV units as compared to 25 IPV units for 1 mil thick moistureproof cellophane, a film thickness of about 3 mils is required for the ethylene polymer to serve satisfactorily as a moistureproof wrap for foodstuffs. By means of this invention one has only to add about 25 per cent paraffin hydrocarbon to the ethylene polymer to obtain a moistureproofness at 1 mil film thickness equivalent to that of moistureproof cellophane. When 40 per cent paraffin hydrocarbon is added to the ethylene polymer the moistureproofneess is more than twice that of moistureproof cellophane.

The paraffin hydrocarbon used in the foregoing example was prepared by the following procedure:

Sulfur-free synthesis gas containing a hydrogen/CO mole ratio of 2:1 was passed over ruthenium catalyst in a silver-lined reaction tube at 200° C. and 2000 p. s. i. pressure at a rate of 1 liter/hour-gram of catalyst. The wax was drained into a hot separator from which it was drawn off from time to time. The product thus obtained was extracted in a Soxhlet type apparatus with pentane until no more extracted after which the residue was extracted with hexane. The residue from the hexane extraction was then extracted with heptane. The portion soluble in heptane melted at 113–119° C. and the residue above 120° C. This fraction was the most effective paraffin hydrocarbon for blending with the ethylene polymer.

As described in the above mentioned patent the tough orientable ethylene polymers used in the practice of this invention correspond in composition substantially to $(CH_2CH_2)_x$, and by X-ray diffraction analysis show a crystalline structure. The polymers of this kind useful for the present purpose melt at a temperature within the range of 85° C. to 120° C. The term "orientable" as used herein refers to the capability of the ethylene polymer in the form of filaments, films, etc., of being cold drawn to a permanent elongation of at least 300% with resulting molecular orientation in the direction of elongation. The polymers of this kind which are used in the practice of this invention have an intrinsic viscosity of at least 0.60 (measured as an 0.125 per cent solution in xylene at 85° C.) which corresponds to a molecular weight of about 10,000. These high molecular weight ethylene polymers are flexible and form limp, tough orientable unsupported films.

In addition to the method of preparation given in U. S. Patents 2,153,553, 2,188,465, 2,334,195 and 2,342,400, these ethylene polymers can be prepared by heating, preferably at 60° C. to 260° C., ethylene in the presence of diethyl dioxide or other dialkyl dioxide as a catalyst. The high molecular weight ethylene polymer used in the foregoing example was prepared by the procedure given in U. S. Patent No. 2,391,920.

The new blends described herein of high molecular weight ethylene polymer with the previously described paraffin hydrocarbon consist essentially of these two polymers and contain the high molecular weight ethylene polymer in major amount and in amount of at least 60% of the blend.

The compositions of this invention can be made by blending solutions of the paraffin hydrocarbon and ethylene polymer, or by milling together the ethylene polymer and paraffin hydrocarbon in a rubber mill or a Banbury mixer, etc.

Pigments, fillers, dyes, antioxidants, plasticizers, and like materials can be added to the compositions of this invention when desirable.

Valuable compositions in many respects comparable to those described above, are obtained by blending with the ethylene polymer a hexachlorethane modified ethylene wax melting above 120° C. and containing at least 3% chlorine. This wax is the high melting hexachloroethane-modified polyethylene-wax obtained by polymerizing ethylene in the presence of hexachloroethane and a peroxy catalyst. This wax is obtained, for example, by heating at about 70° C. in an inert atmosphere a charge which comprises water as polymerization medium and 5 parts of hexachloroethane, and which occupies 25% of the volume of the reactor with ethylene under a pressure of from 850 to 950 atmospheres until the white crystalline wax of about 4000 molecular weight melting about 121° C., and containing about 5.5% chlorine is obtained. Compositions composed of this wax and the high molecular weight ethylene polymer in the proportions used for the low molecular weight paraffin hydrocarbon listed in the foregoing table exhibited the best bending modulus and moisture impermeability (.050 and about 20 respectively) for a composition composed of 40% ethylene polymer and 60% of the wax.

Besides being stiffer and more moistureproof than ethylene polymers the compositions of matter comprising this invention are also more plastic, more extrudable, and higher melting than the tough, orientable polyethylene used to make up the composition. These compositions produced in accordance with this invention are particularly valuable for unsupported wrapping films, extruded, compression, and injected molded articles, hot melt applications, cable coatings, electrical and thermal insulating materials, protective coatings over paper, metals and fabrics.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a blend of an ethylene polymer which melts at a temperature in the range of 85° to 120° C., corresponds in composition substantially to $(CH_2.CH_2)_x$, has an intrinsic viscosity of at least 0.60, and has a permanent elongation of at least 300% with resulting molecular orientation in the direction of elongation, and a paraffin hydrocarbon obtained by the catalytic hydrogenation of carbon monoxide, characterized in that it has a melting point above 120° C., a bending modulus greater than $0.070 \times 10^6$ pounds per square inch, and an initial permeability value of less than 20 I. P. V. units at one mil thickness, said blend of ethylene polymer and paraffin hydrocarbon consisting of from 80% to 60% of said ethylene polymer and from 20% to 40% of said paraffin hydrocarbon.

2. An unsupported moisture-proof wrapping film consisting essentially of the blend of ethylene polymer and paraffin hydrocarbon wax defined in claim 1.

RALPH ALBERT JACOBSON.

REFERENCES CITED

The following references are of record in the file of this patent:

UNITED STATES PATENTS

| Number | Name | Date |
| --- | --- | --- |
| 2,351,345 | Kleine | June 13, 1944 |
| 2,352,328 | Kleine | June 27, 1944 |

OTHER REFERENCES

Irvin, India Rubber World, pages 65 and 66, October 1944.

Hunter et al., pages 49 and 55, Trans. Faraday Society, vol. 41, February 1945.

Hahn et al., pages 526 and 531–533, Ind. & Eng. Chem., June 1945.